United States Patent
Ehrke et al.

(10) Patent No.: US 7,868,782 B2
(45) Date of Patent: *Jan. 11, 2011

(54) COMMODITY MONITORING NETWORK

(75) Inventors: Lance A. Ehrke, Brookfield, WI (US); Kimbel A. Nap, Glendale, WI (US); Donn R. Dresselhuys, Shorewood, WI (US)

(73) Assignee: Silver Spring Networks, Inc., Redwood City, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/109,149

(22) Filed: Apr. 24, 2008

(65) Prior Publication Data

US 2008/0224891 A1 Sep. 18, 2008

Related U.S. Application Data

(60) Division of application No. 11/894,333, filed on Aug. 21, 2007, now Pat. No. 7,772,989, which is a division of application No. 10/672,781, filed on Sep. 26, 2003, now Pat. No. 7,277,027, which is a continuation of application No. 10/319,856, filed on Dec. 13, 2002, now abandoned, which is a continuation of application No. 09/242,792, filed on Feb. 23, 1999, now Pat. No. 6,538,577.

(51) Int. Cl.
G08B 23/00 (2006.01)

(52) U.S. Cl. .................. 340/870.12; 340/870.02; 370/401; 370/437

(58) Field of Classification Search ........... 340/870.12, 340/870.02; 370/401, 437, 346; 375/214
See application file for complete search history.

(56) References Cited

U.S. PATENT DOCUMENTS

| 4,791,362 | A | * | 12/1988 | Philpot ................... 324/142 |
| 4,792,946 | A | * | 12/1988 | Mayo ..................... 370/245 |
| 5,166,952 | A | * | 11/1992 | Omura et al. ............. 375/149 |
| 5,408,523 | A | * | 4/1995 | McEachern et al. .... 379/106.03 |
| 5,432,507 | A | * | 7/1995 | Mussino et al. ......... 340/870.03 |
| 5,553,094 | A | * | 9/1996 | Johnson et al. ............ 375/130 |
| 5,590,179 | A | * | 12/1996 | Shincovich et al. .... 379/106.06 |
| 5,664,202 | A | * | 9/1997 | Chen et al. ................ 713/340 |
| 5,811,675 | A | * | 9/1998 | Hamer ..................... 73/198 |
| 5,898,387 | A | * | 4/1999 | Davis et al. ............ 340/870.02 |
| 5,923,269 | A | * | 7/1999 | Shuey et al. ............ 340/870.02 |
| 5,933,004 | A | * | 8/1999 | Jackson et al. ............ 324/142 |
| 6,118,269 | A | * | 9/2000 | Davis ..................... 324/110 |

(Continued)

*Primary Examiner*—Albert K Wong
(74) *Attorney, Agent, or Firm*—Buchanan Ingersoll & Rooney PC

(57) ABSTRACT

An electronic electric meter for use in a networked automatic meter reading environment. The meter includes a meter microcontroller, a measurement microcontroller, a communication microcontroller and spread spectrum processor, and a plurality of other communication interface modules for communicating commodity utilization and power quality data to a utility. The meter measures electricity usage and monitors power quality parameters for transmission to the utility over a spread spectrum local area network (LAN) to a remotely located gateway node. The gateway node transmits this data to the utility over a commercially available fixed wide area network (WAN). The meter also provides direct communication to the utility over a commercially available network interface that plugs into the meter's backplane or bus system, bypassing the local area network communication link and gateway node.

17 Claims, 9 Drawing Sheets

U.S. PATENT DOCUMENTS

| | | | |
|---|---|---|---|
| 6,239,722 B1 * | 5/2001 | Colton et al. | 340/870.02 |
| 6,246,677 B1 * | 6/2001 | Nap et al. | 370/346 |
| 6,362,745 B1 * | 3/2002 | Davis | 340/637 |
| 6,363,057 B1 * | 3/2002 | Ardalan et al. | 370/252 |
| 6,437,692 B1 * | 8/2002 | Petite et al. | 340/540 |
| 7,064,679 B2 * | 6/2006 | Ehrke et al. | 340/870.02 |

\* cited by examiner

COMMODITY MONITORING NETWORK

CROSS REFERENCE TO RELATED APPLICATIONS

This application is a divisional of application Ser. No. 11/894,333, filed Aug. 21, 2007, which is a divisional of application Ser. No. 10/672,781, filed Sep. 26, 2003, now U.S. Pat. No. 7,277,027, which is a continuation of application Ser. No. 10/319,856, filed Dec. 12, 2002, now abandoned, which is a continuation of application Ser. No. 09/242,792, filed Sep. 5, 1997, now U.S. Pat. No. 6,538,577.

BACKGROUND OF THE INVENTION

The present invention relates to apparatus for measuring usage of a commodity. More particularly, the invention relates to an electronic electric meter for measuring consumption of electricity and communicating that usage data and other power information to a utility over a two-way wireless local area network (LAN) to a remotely located gateway node that transmits the data over a two-way fixed common carrier wide area network (WAN), or communicating that data directly to the utility, over a commercially available two-way data communication network.

Commodity usage is conventionally determined by utility companies using meters that monitor subscriber consumption. The utility service provider typically determines the subscriber's consumption by sending a service person to each meter location to manually record the information displayed on the meter dial. The manual reading is then entered into a computer which processes the information and outputs a billing statement for the subscriber. However, it is often difficult for the service person to access the meter for reading, inspection and maintenance. When access to a meter is not possible, billings are made on the basis of estimated readings. These estimated billings often lead to customer complaints.

Currently available electric meters such as watt-hour meters work well for their intended purpose, but they must be manually read. This makes it difficult to cost effectively measure electricity usage for each user to promote fair billing and encourage conservation. Manual reading of electric meter is highly labor intensive, inefficient and very expensive. Therefore, there has been a strong interest on the part of utility companies to take advantage of modem technology to reduce operating costs and increase efficiency by eliminating the necessity for manual readings.

Many attempts have been made in recent years to develop an automatic meter reading system for electric meters which avoid the high costs of manual meter reading. However, most of these prior art systems have achieved little success. For automatic or remote meter reading, a transducer unit must be used with the meters to detect the output of such meters and transmit that information back to the utility.

Various types of devices have been attached to utility meters in an effort to simplify meter reading. These devices were developed to transfer commodity usage data over a communication link to a centrally located service center or utility. These communication links included telephone lines, power lines, or a radio frequency (RF) link.

The use of existing telephone lines and power lines to communicate commodity usage data to a utility have encountered significant technical difficulties. In a telephone line system, the meter data may interfere with the subscriber's normal phone line operation, and would require cooperation between the telephone company and the utility company for shared use of the telephone lines. A telephone line communication link would also require a hard wire connection between the meter and the main telephone line, increasing installation costs. The use of a power line carrier (PLC) communication link over existing power lines would again require a hard wire connection between the meter and the main power line. Another disadvantage of the PLC system is the possibility of losing data from interference on the power line.

Meters have been developed which can be read remotely. Such meters are configured as transducers and include a radio transmitter for transmitting data to the utility. These prior art systems required the meter to be polled on a regular basis by a data interrogator. The data interrogator may be mounted to a mobile unit traveling around the neighborhood, incorporated within a portable hand-held unit carried by a service person, or mounted at a centrally located site. When the meter is interrogated by an RF signal from the data interrogator, the meter responds by transmitting a signal encoded with the meter reading and any other information requested. The meter does not initiate the communication.

However, such prior art systems have disadvantages. The first disadvantage is that the device mounted to the meter generally has a small transceiver having a very low power output and thus a very short range. This would require that the interrogation unit be in close proximity to the meters. Another disadvantage is that the device attached to the meter must be polled on a regular basis by the data interrogator. The device attached to the meter is not able to initiate a communication. The mobile and hand-held data interrogators are of limited value since it is still necessary for utility service personnel to travel around neighborhoods and businesses to remotely read the meters. It only avoids the necessity of entering a residence or other building to read the meters. The systems utilizing a data interrogator at fixed locations still have the disadvantages of low power output from the devices attached to the meters, and requiring polling by the data interrogator to initiate communication.

Therefore, although automatic meter reading systems are known in the prior art, the currently available automatic meter reading systems suffer from several disadvantages, such as low operating range and communication reliability. Thus, it would be desirable to provide an electronic electric meter to retrofit into existing meter sockets or for new installations that enables cost effective measurement of electricity usage by a consumer. It would also be desirable to have an electric meter that is capable of providing automatic networked meter reading.

SUMMARY OF THE INVENTION

An object of the present invention is to provide an integrated fully electronic electric meter that retrofits into existing meter sockets and is compatible with current utility operations.

Another object of the invention is to provide an electronic electric meter that communicates commodity utilization data and power quality information to a utility over a two-way wireless spread spectrum local area network to a gateway node that transmits the data over a two-way fixed common carrier wide area network, or communicates the data directly to the utility over a commercially available two-way data communication network.

A further object of the invention is to provide a gateway node for receiving commodity utilization data and power quality information from the electric meter and transmitting that data to a utility service provider over a commercially available fixed common carrier wide area network.

Yet another object of the invention is to provide an electronic electric meter that communicates commodity utilization data and power quality information upon interrogation by a communication node, at preprogrammed scheduled reading times, and by spontaneous reporting of tamper or power outage conditions.

Yet another object of the invention is to provide an electronic electric meter that is of a modular construction to easily allow an operator to change circuit boards or modules depending upon the desired data communication network.

The present invention is a fully electronic electric meter for collecting, processing and transmitting commodity utilization and power quality data to a utility service provider.

The electronic electric meter is of a modular design allowing for the removal and interchangeability of circuit boards and modules within the meter. All of the circuit boards and modules plug into a common backplane or busing system.

The electric meter is able to communicate commodity utilization data and power quality information to a utility over a local area network (LAN) or a wide area network (WAN). A radio frequency (RF) transceiver located within the meter creates a LAN link between the meter and a gateway node located remotely from the meter. This LAN utilizes a 900 MHz spread spectrum communication technique for transmitting commodity utilization data and power quality information from the meter to the gateway node, and for receiving interrogation signals from the gateway node.

The electric meter is also able to communicate directly with the utility through the variety of commercially available communication network interface modules that plug into the meter's backplane or bus system. For example, these modules might include a narrowband personal communication services (PCS) module or a power line carrier (PLC) module. For these modules, a gateway node is not necessary to complete the communication link between the meter and the utility.

The gateway node is located remotely from the meter to complete the local area network. The gateway node is also made up of four major components. These components include a wide area network interface module, an initialization microcontroller, a spread spectrum processor and an RF transceiver. The gateway node is responsible for providing interrogation signals to the meter and for receiving commodity utilization data from the interface management unit for the local area network. However, the gateway node also provides the link to the utility service provider over a commercially available fixed two-way common carrier wide area network.

The RF transceiver of the gateway node transmits interrogation signals from the utility or preprogrammed signals for scheduled readings to the electric meter, and receives commodity utilization data in return from the meter for transmission to the utility over the wide area network. The spread spectrum processor is coupled to the RF transceiver and enables the gateway node to transmit and receive data utilizing the spread spectrum communication technique. The WAN interface module is coupled to the spread spectrum processor and transmits data to and from the utility service provider over any commercially available wide area network that is desired. A different WAN interface module can be used for each different commercially available wide area network desired. The initialization microcontroller is interposed between the interface module and the spread spectrum processor for controlling operation of the spread spectrum processor and for controlling communication within the gateway node.

Meter reading, meter information management and network communications are all controlled by two-way system software that is preprogrammed into the electric meter's memory during manufacture and installation. The software enables an operator to program utility identification numbers, meter settings and readings, units of measure and alarm set points.

DETAILED DESCRIPTION OF THE INVENTION

Electronic Electric Meter

Figure 1:
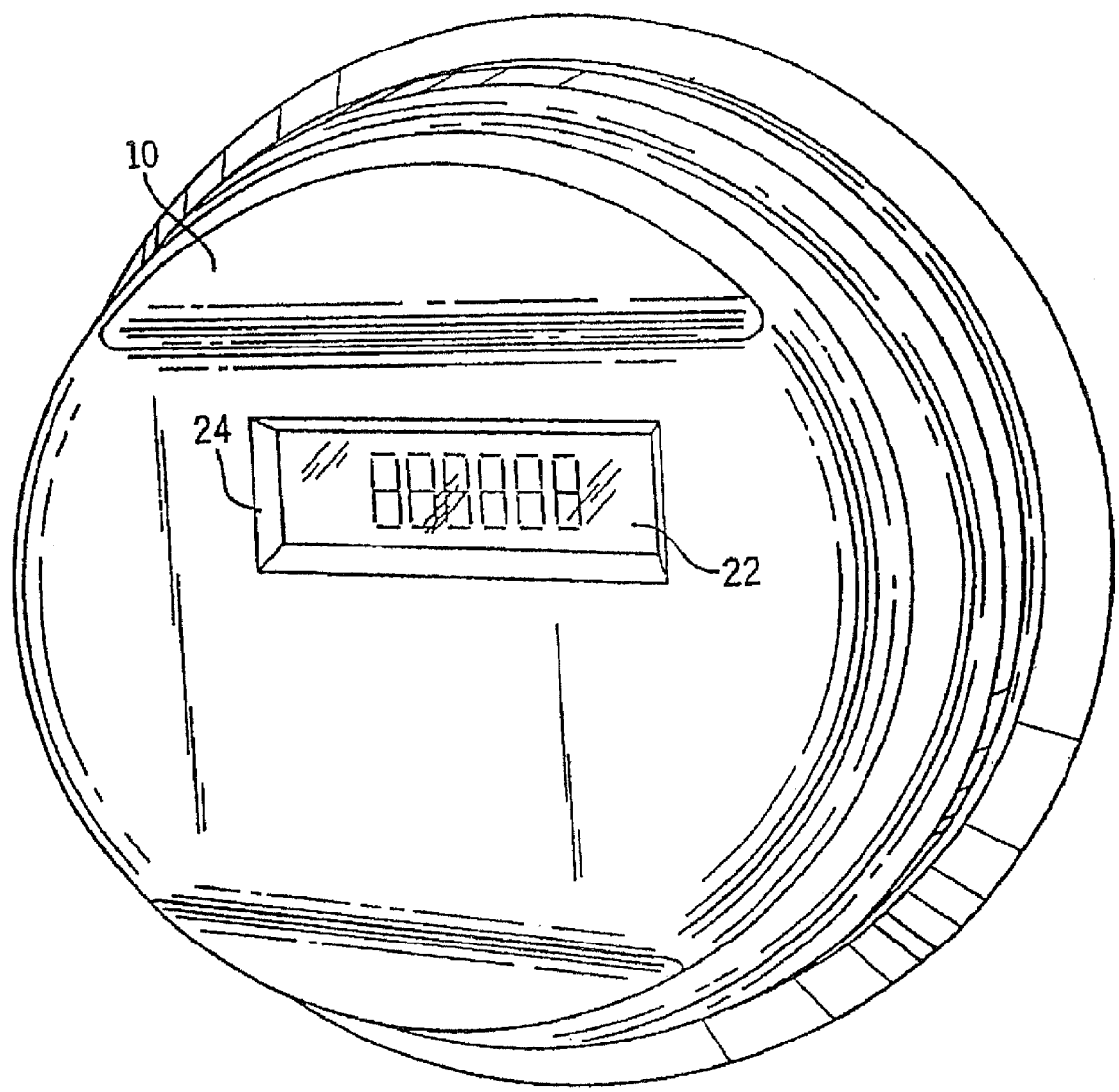
FIG. 1 is a perspective view of an electronic electric meter in accordance with the present invention.
Figure 2:
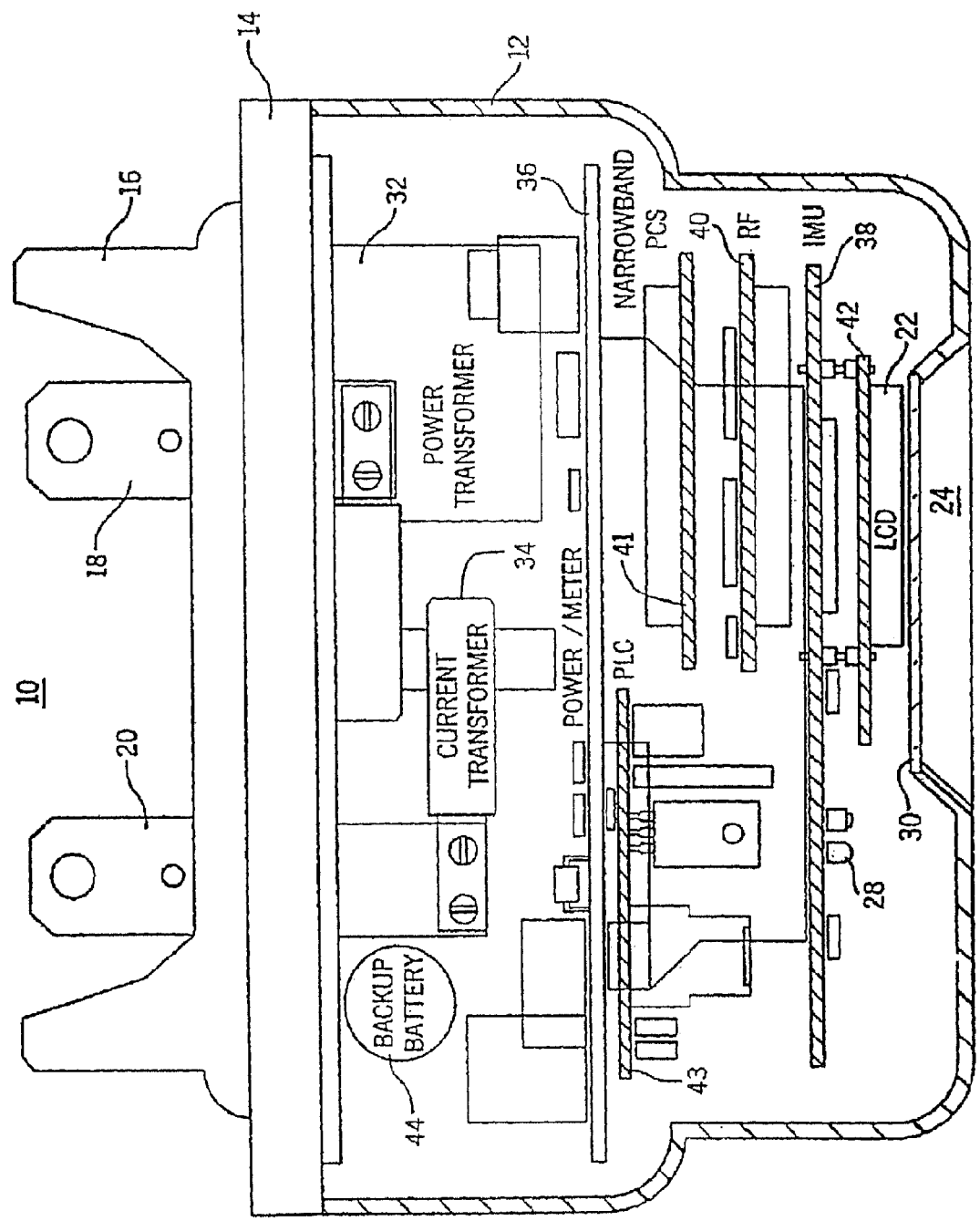
FIG. 2 is a cross-sectional view of the internal structure of the electric meter shown in FIG. 1.

FIGS. 1 and 2 show a fully integrated, self-contained electronic electric meter 10 for measuring electricity usage and monitoring power quality. The meter 10 is operable for both single phase and three phase electric power installations. The meter 10 includes a top cover 12 attached to a meter base 14. Extending outwardly from the meter base 14 is a mounting frame 16 and a pair of terminals 18, 20. The meter 10 easily retrofits into existing meter sockets by insertion of terminals 18, 20 into the sockets and interlocking the mounting frame to secure the meter in place. The terminals 18, 20 complete the connection between the electric power line and the meter 10. The meter 10 further includes a liquid crystal display 22 for displaying meter readings and settings, units of measure and status conditions. The top cover 12 includes a rectangular opening 24 for the LCD 22. A rectangularly shaped transparent piece of glass or plastic covers the rectangular opening 24 for viewing LCD 22.

As shown in FIG. 2, the fully electronic, self-contained, modular electric meter 10 includes several electronic sub-assemblies. The sub-assemblies include a power transformer 32, a current transformer 34, a power/meter circuit board 36, an interface management unit circuit board 38, an RF transceiver sub-assembly 40, an LCD sub-assembly 42, and a variety of commercially available plug in network modules, such as a narrowband personal communication services (PCS) module 41 and a power line carrier (PLC) module 43.

All of the circuit boards and modules plug into a common backplane or busing system (not shown) providing a modular construction allowing for interchangeability of circuit boards and modules depending on the data communication network desired. While the meter 10 is shown as an electric meter, the meter 10 can also be configured to measure other physical characteristics such as water and gas.

Circuitry of Electronic Electric Meter

Figure 3:
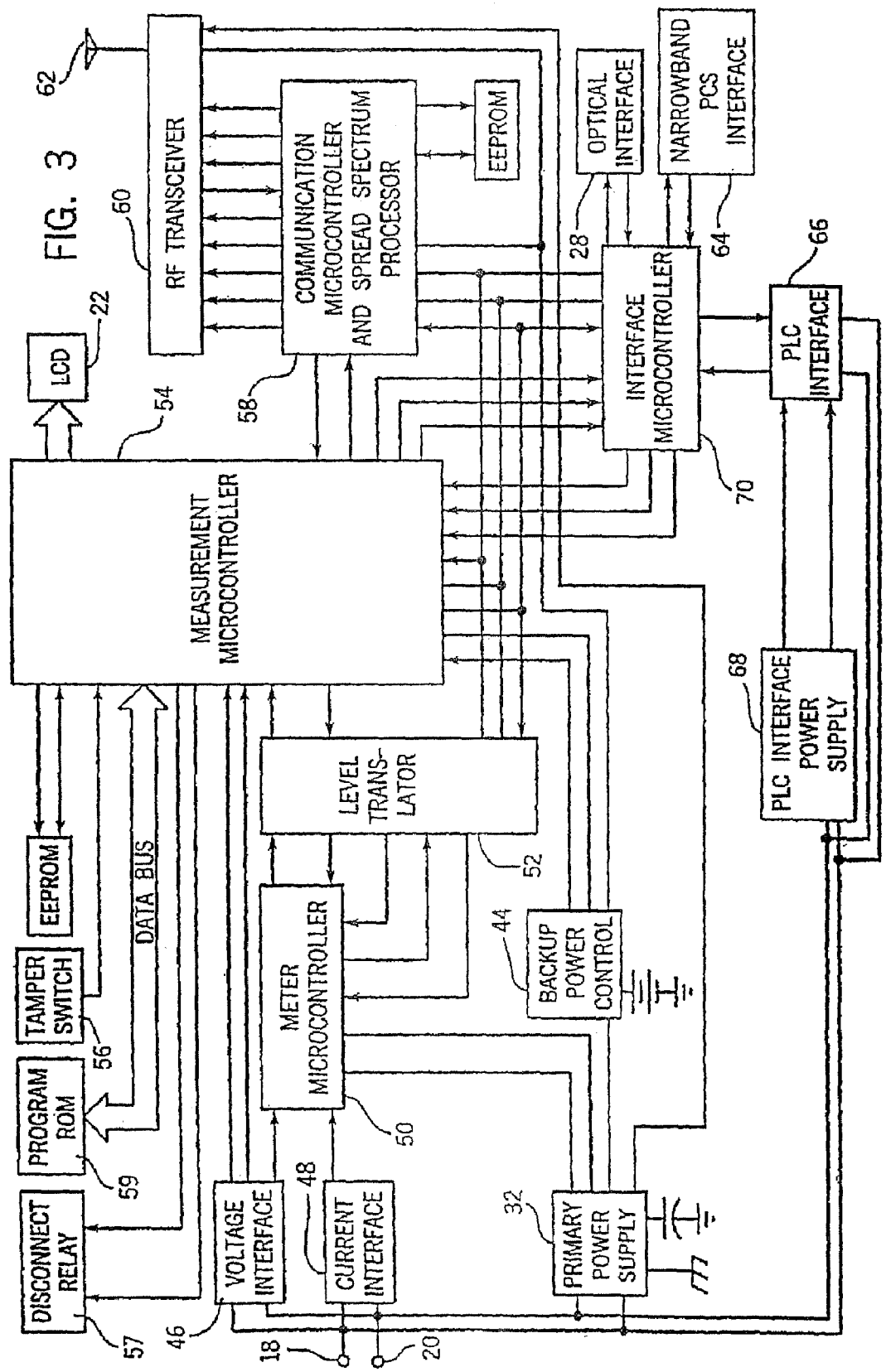
FIG. 3 is a block diagram of the electric meter circuitry.

FIG. 3 shows a block diagram of the electric meter's internal circuitry. The meter 10 is powered directly from the electric power line coming through terminals 18, 20 and into power transformer 32 to provide the DC power required of the meter circuitry. Back up battery power 44 is provided in case of electrical power outages.

The electrical power flowing through terminals 18 and 20 is sensed by voltage interface transducer 46 and current interface transducer 48. The accumulated pulse totalization from transducers 46 and 48 is input into meter microcontroller 50 which interprets the electrical signal data received from transducers 46 and 48. The processed electrical signal data is then sent through a level translator 52 to condition the signals for the required input into measurement microcontroller 54. Measurement microcontroller 54 performs additional calculations on the electrical signals received from meter microcontroller 50 and prepares them for output to the LCD 22 or an appropriate communication network. Meter microcontroller 50 may comprise the integrated circuit sold by SAMES of South Africa under the designation SA9603B. The measurement microcontroller 54 is an SMOS chip available under the designation SMC AA316F03.

The measurement microcontroller 54 also monitors inputs from tamper switch 56 and disconnect relay 57 for disconnecting the meter from the electrical line. The program ROM 59 contains customer specific and site specific variables that may be important for calculating electricity usage. The meter 10 has an accuracy of approximately 0.2% for a power input current range of 0-200 amps. Other features that the measurement microcontroller 54 is able to measure are kilowatt hour usage, voltage and frequency measurements, energy direction, time and date reporting, load profiling and failure reporting. The power/meter circuit board includes measurement microcontroller 54, level translator 52, meter microcontroller 50, backup battery 44, and primary power supply 32.

Electric meter 10 is able to communicate commodity utilization data and power quality information to a utility over a local area network (LAN) or a wide area network (WAN). A radio frequency (RF) communication section within the electric meter 10 is comprised by a communication microcontroller and a spread spectrum processor chip 58 and an RF transceiver 60. An antenna 62 is coupled to the RF transceiver 60 for transmitting and receiving RF spread spectrum signals.

The communication microcontroller portion of chip 58 is responsible for all aspects of radio frequency (RF) communication management in electric meter 10 including determining the presence of a valid interrogating signal from a remotely located gateway node. The communication microcontroller portion of chip 58 provides control information to spread spectrum processor portion of chip 58 and RF transceiver 60 to control spread spectrum protocol and RF channelization. Communication microcontroller and spread spectrum processor chip 58 may comprise the integrated circuit sold by Siliconians of California, under the designation SS105.

The spread spectrum communication technique makes use of a sequential noise-like signal structure, for example, pseudo-noise (PN) codes to spread a normally narrowband information signal over a relatively wide band of frequencies. This spread spectrum communication technique may be further understood by reference to U.S. Pat. No. 5,166,952 and the numerous publications cited therein.

The use of the spread spectrum communication technique, when used in conjunction with the direct sequence modulation technique, hereinafter described, gives the LAN data communication system a measure of security. This communication technique also avoids the need to obtain licensure from governmental authorities controlling radio communication.

The spread spectrum processor portion of chip 58 functions to perform spread spectrum encoding of the data from communication microcontroller provided to RF transceiver 60 and decoding of the spread spectrum data from the RF transceiver. A better understanding of the spread spectrum communication technique can be obtained by reading the subject matter under the subheading entitled "Circuitry of Gateway Node". The RF transceiver 60 and communication microcontroller and spread spectrum processor chip 58 are part of the circuitry on interface management unit board 38 and RF module 40 of FIG. 2.

The meter 10 also includes plugin interface modules which correspond to a variety of different commercially available LAN or WAN communication devices. These communication devices provide a communication link directly from the electric meter 10 to a utility service provider. For example, shown in FIG. 3, is a narrow band personal communication services (PCS) interface module 64, and a power line carrier (PLC) interface module 66 powered by a PLC interface power supply 68. These communication interface modules are easily interchangeable within electric meter 10. These modules communicate with the measurement microcontroller 54 and an interface microcontroller 70 along a common backplane or busing system (not shown). Exemplary meter interfaces includes the PowerPoint electronic meter interface for the GE KV II meter equipped with an internal antenna, or the GE KV II meter equipped with external antenna. When the meter 10 is configured to measure water or aqueous characteristics, a water interface management unit ("IMU") interface such as the Silver Spring Network water IMU can be used. When the meter 10 is configured to measure gaseous characteristics, the Silver Spring Network gas IMU is an exemplary interface. Other exemplary interfaces include MTC Raven communications package V2.2, Siemens S4 communication package V2.2, or Schlumberger Vectron communication package V2.2.

Networked Automatic Meter Reading Data Communication System

Figure 5:
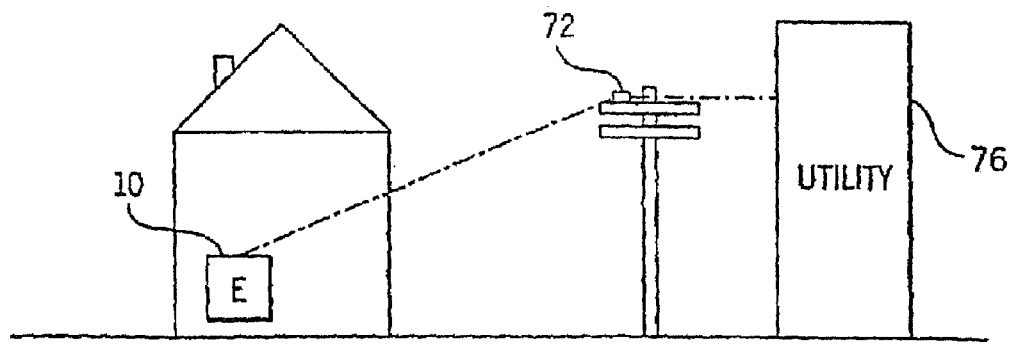
FIG. 5 is a schematic view of the electric meter interfacing with a remote gateway node and a utility service provider, creating a networked automatic meter reading data communication system.
Figure 6:
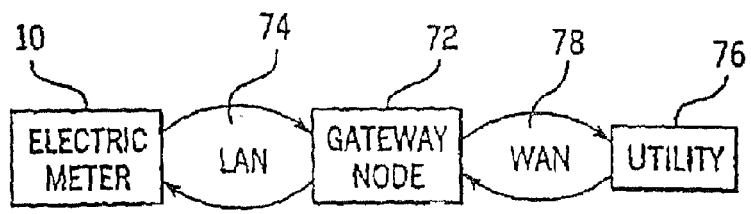
FIG. 6 is a flow diagram of the automatic meter reading data communication system shown in FIG. 5.

In a preferred embodiment of the invention, FIGS. 5 and 6, the electric meter 10 communicates over a local area network (LAN) 74 to a gateway node 72 which transmits the commodity data from the electric meter 10 to a utility 76 over a fixed common carrier wide area network (WAN) 78. The gateway node 72 provides the end to end communication links from the meter 10 to the utility 76. A first link in the data communication system is a two-way 900 MHz spread spectrum LAN 74. The second link within the data communication system is designed to be any commercially available two-way common carrier WAN 78. In this embodiment, a gateway node 72 must be within the communication range of the electric meter 10 which is approximately one mile.

In an alternate embodiment, the electric meter 10 provides direct local area and wide area network access through printed circuit board sub-assemblies installed in meter 10 described above.

Figure 8:
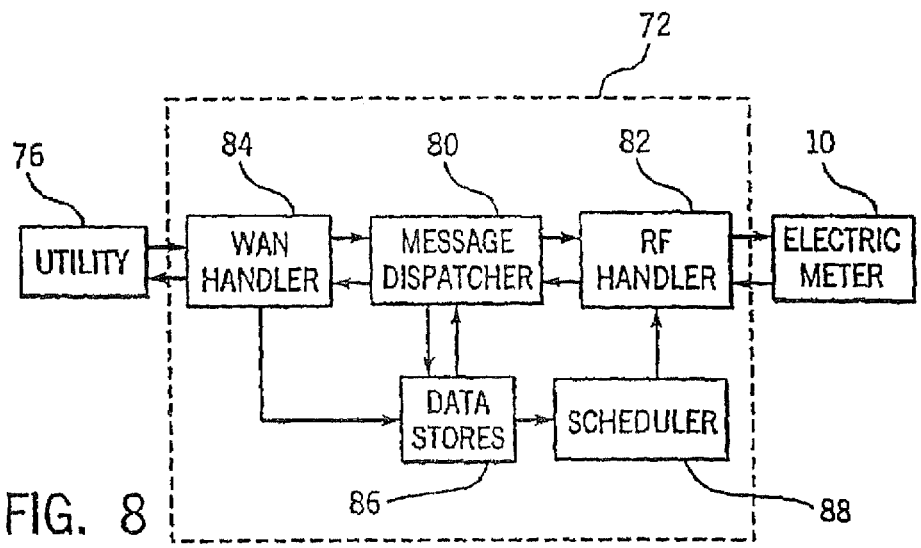
FIG. 8 is a functional block diagram of the automatic meter reading data communication system of FIGS. 5 and 6.

A more detailed representation of the preferred embodiment is shown in FIGS. 8 and 9A-9E. FIG. 8 shows a functional flow diagram of the networked automatic meter reading data communication system of the present invention in which the components are described as functional blocks. The flow diagram FIG. 8, includes the main functional components of the gateway note 72 which include a message dispatcher 80, an RF handler 82, a WAN handler 84, a data stores component 86 and a scheduler component 88. The data stores and scheduler components comprise data that is preprogrammed into the gateway node's memory. The gateway node 72 interfaces with the electric meter 10 over the two-way wireless LAN 74. The gateway node 72 also interfaces with the utility service provider 76 over the fixed common carrier WAN 78.

Figure 9A:
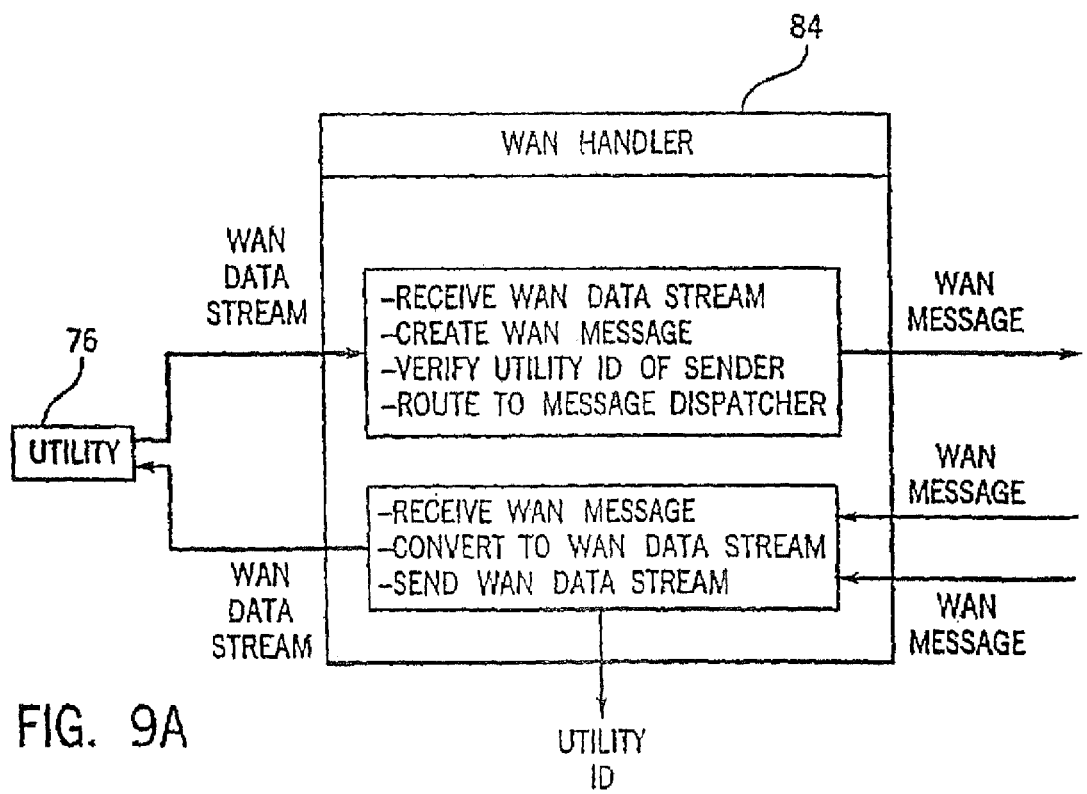
FIG. 9A is a flow diagram of the WAN handler portion of the data communication system of FIG. 8.

FIG. 9A is a detailed functional diagram of the WAN handler 84 of FIG. 8. In a typical communication episode, the utility 76 may initiate a request for data from the electric meter 10 by sending a data stream over the WAN 78. The WAN handler 84 of the gateway node 72 receives the WAN data stream, creates a WAN message, verifies the utility ID of the sender from the data stores 86 and routes the WAN message to the message dispatcher 80 in the gateway node.

Figure 9B:
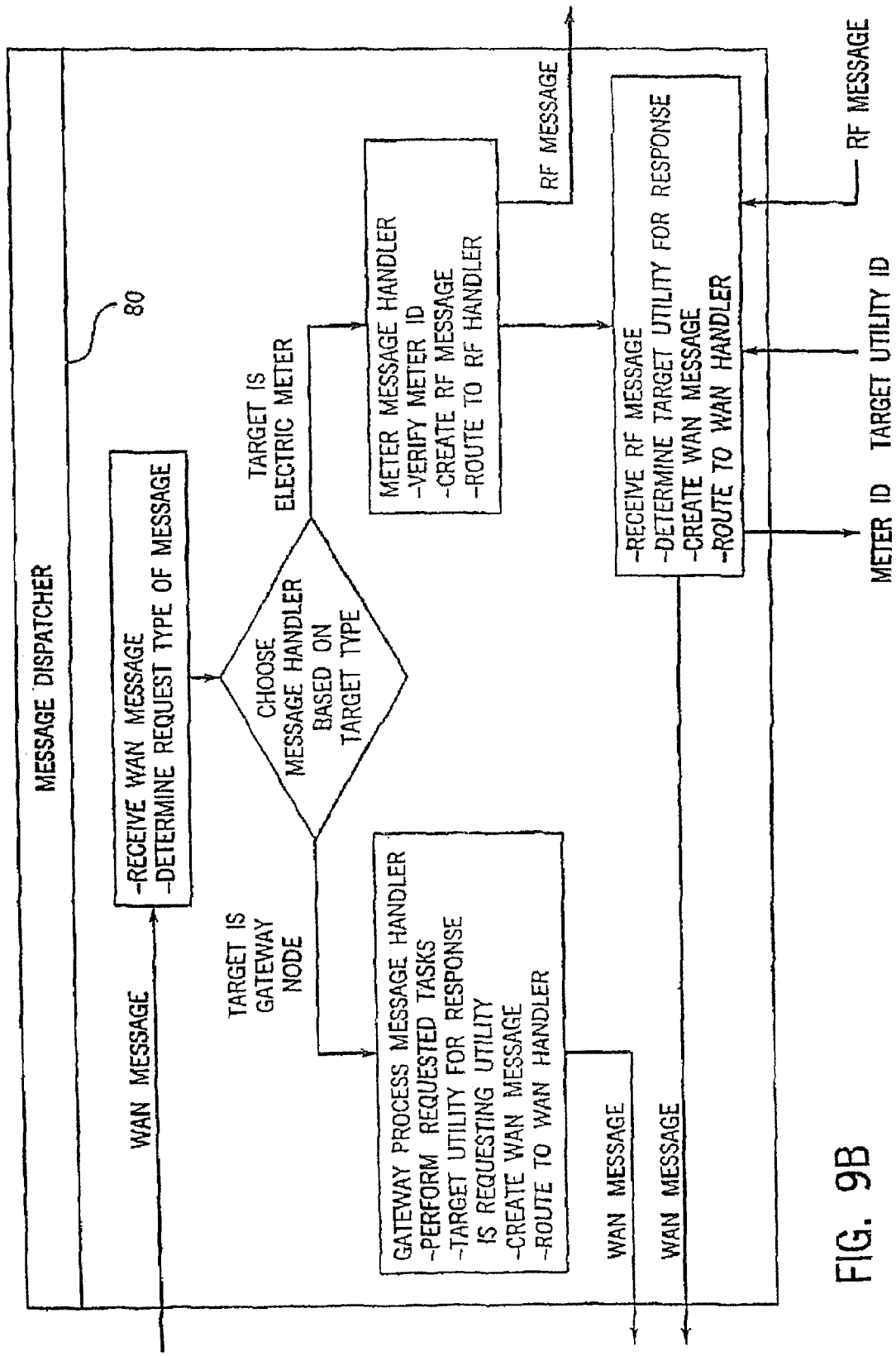
FIG. 9B is a flow diagram of the message dispatcher portion of the data communication system of FIG. 8.

Referring now to FIG. 9B, the message dispatcher 80 receives the WAN message from the WAN handler 84 and determines the request from the utility 76. The message dispatcher 80 determines that the end recipient or target is the electronic meter 10. The message dispatcher 80 then verifies the meter ID from the data stores 86, creates an RF message and routes the RF message to the RF handler 82.

Figure 9C:
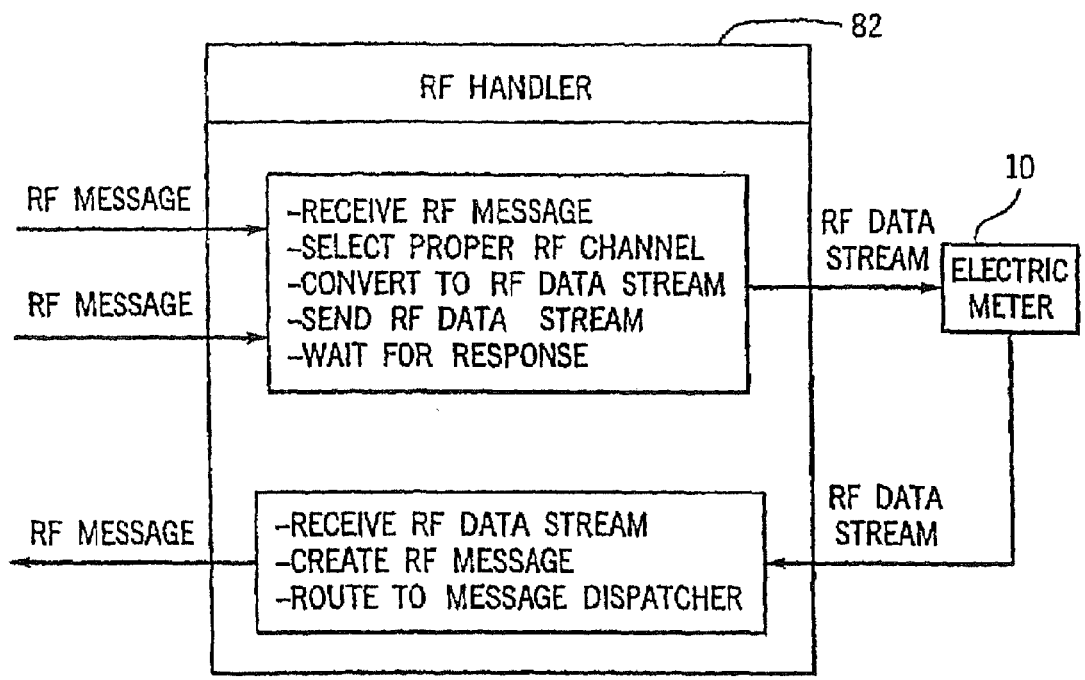
FIG. 9C is a flow diagram of the RF handler portion of the data communication system of FIG. 8.

Referring now to FIG. 9C, the RF handler 82 receives the RF message from the message dispatcher 80, selects a proper RF channel, converts the RF message to an RF data stream, sends the RF data stream to the electric meter 10 over the LAN 74 and waits for a response. The electric meter 10 then responds by sending an RF data stream over the LAN 74 to the RF handler 82 of the gateway node 72. The RF handler 82 receives the RF data stream, creates an RF message from the RF data stream and routes the RF message to the message dispatcher 80. As shown in FIG. 9B, the message dispatcher 80 receives the RF message, determines the target utility for response from the data stores 86, creates a WAN message and routes the WAN message to the WAN handler 84. The WAN handler 84 receives the WAN message from the message dispatcher 80, converts the WAN message to a WAN data stream and sends the WAN data stream to the utility 76 over the fixed common carrier WAN 78, as shown in FIG. 9A to complete the communication episode.

Figure 9D:
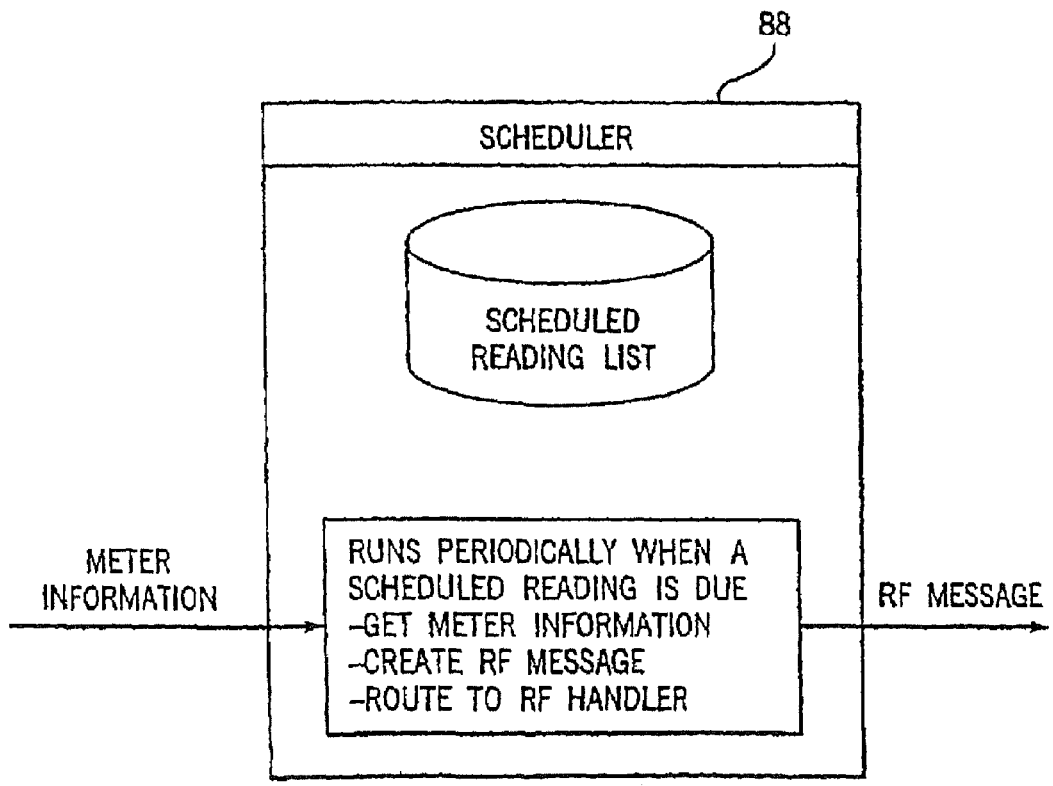
FIG. 9D is a flow diagram of the scheduler portion of the data communication system of FIG. 8.

A communication episode can also be initiated by scheduled readings preprogrammed into the scheduler 88 of the gateway node as shown in FIG. 9D. A list of scheduled reading times is preprogrammed into memory within the gateway node 72. The scheduler 88 runs periodically when a scheduled reading is due. When it is time for a scheduled reading, the scheduler 88 retrieves meter 10 information from the data stores 86, creates an RF message and routes the RF message to the RF handler 82, receives the RF message, selects a proper RF channel, converts the RF message to an RF data stream, sends the RF data stream to the electric meter 10 and waits for a response. The meter then responds with an RF data stream to the RF handler 82. The RF handler 82 receives the RF data stream, creates an RF message from the RF data stream and routes the RF message to the message dispatcher 82. The message dispatcher 80 receives the RF message, determines the target utility for response from the data stores 86, creates a WAN message and routes the WAN message to the WAN handler 84. The WAN handler 84 receives the WAN message, converts the WAN message to a WAN data stream and sends the WAN data stream to the utility 76.

Occasionally, the utility 76 may request data that is stored within the gateway node's memory. In this case, the utility 76 initiates the communication episode by sending a WAN data stream to the WAN handler 84. The WAN handler 84 receives the WAN data stream, creates a WAN message, verifies the utility ID of the sender in the data stores 86 and routes the WAN message to the message dispatcher 80. As shown in FIG. 15B, the message dispatcher 80 receives the WAN message and determines the request from the utility 76. The message dispatcher 80 then determines the target of the message. If the data requested is stored in the gateway node memory, then the gateway node 72 performs the requested task, determines that the requesting utility is the target utility for a response, creates a WAN message and routes the WAN message to the WAN handler 84. The WAN handler 84 receives the WAN message, converts the WAN message to a WAN data stream and sends the WAN data stream to the utility 76.

The last type of communication episode is one which is initiated by the electric meter 10. In this case, the meter detects an alarm outage or tamper condition and sends an RF data stream to the RF handler 82 of the gateway node 72. The RF handler 82 receives the RF data stream, creates an RF message from the RF data stream and routes the RF message to the message dispatcher 80. The message dispatcher 80 receives the RF message, determines the target utility for response from the data stores 86, creates a WAN message and routes the WAN message to the WAN handler 84. The WAN handler 84 receives the WAN message, converts the WAN message to a WAN data stream and sends the WAN data stream to the utility 76.

There are thus three different types of communication episodes that can be accomplished within the automatic meter reading data communication system shown in FIGS. 8 and 9A-E. The automatic meter reading functions incorporated in electric meter 10 include monthly usage readings, demand usage readings, outage detection and reporting, tamper detection and notification, load profiling, first and final meter readings, and virtual shutoff capability.

FIG. 9D represents information or data that is preprogrammed into the gateway node's memory. Included within the memory is a list of scheduled reading times to be performed by the interface management unit. These reading times may correspond to monthly or weekly usage readings, etc.

Figure 9E:
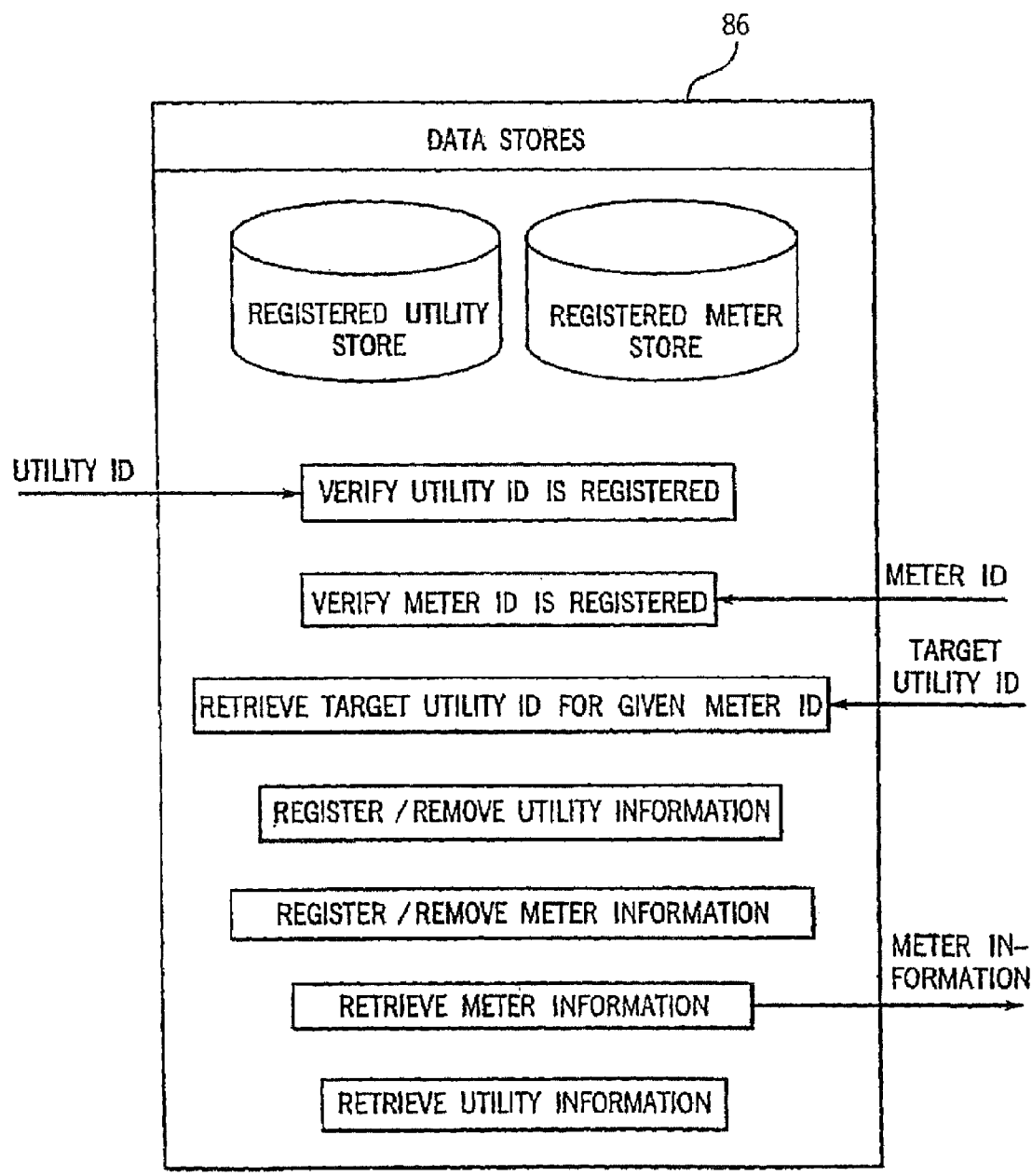
FIG. 9E is a flow diagram of the data stores portion of the data communication system of FIG. 8.

FIG. 9E represents data or information stored in the gateway node's memory dealing with registered utility information and registered interface management unit information. This data includes the utility identification numbers of registered utilities, interface management unit identification numbers of registered interface management units, and other information for specific utilities and specific interface management units, so that the gateway node may communicate directly with the desired utility or correct electric meter.

Electronic Electric Meter Virtual Shut-Off Function

The virtual shut-off function of the electric meter 10 is used for situations such as a change of ownership where a utility service is to be temporarily inactive. When a residence is vacated there should not be any significant consumption of electricity at that location. If there is any meter movement, indicating unauthorized usage, the utility needs to be notified. The tamper switch 56 of the electric meter 10 provides a means of flagging and reporting meter movement beyond a preset threshold value.

Activation of the virtual shut-off mode is accomplished through the "set virtual threshold" message, defined as a meter count which the electric meter is not to exceed. In order to know where to set the threshold it is necessary to know the present meter count. The gateway node reads the meter count, adds whatever offset is deemed appropriate, sends the result to the electric meter as a "set virtual shut-off" message. The electric meter will then enable the virtual shut-off function. The electric meter then accumulates the meter counts. If the meter count is greater than the preset threshold value then the electric meter sends a "send alarm" message to the gateway node until a "clear error code" message is issued in response by the gateway node. However, if the meter count is less than the preset threshold value then the electric meter continues to monitor the meter count. The virtual shut-off function may be canceled at any time by a "clear error code" message from the gateway node.

If the meter count in the meter does not exceed the preset threshold value at any given sampling time, then the meter continues to count until the preset threshold count is attained or until operation in the virtual shut-off mode is canceled.

Gateway Node

Figure 4:
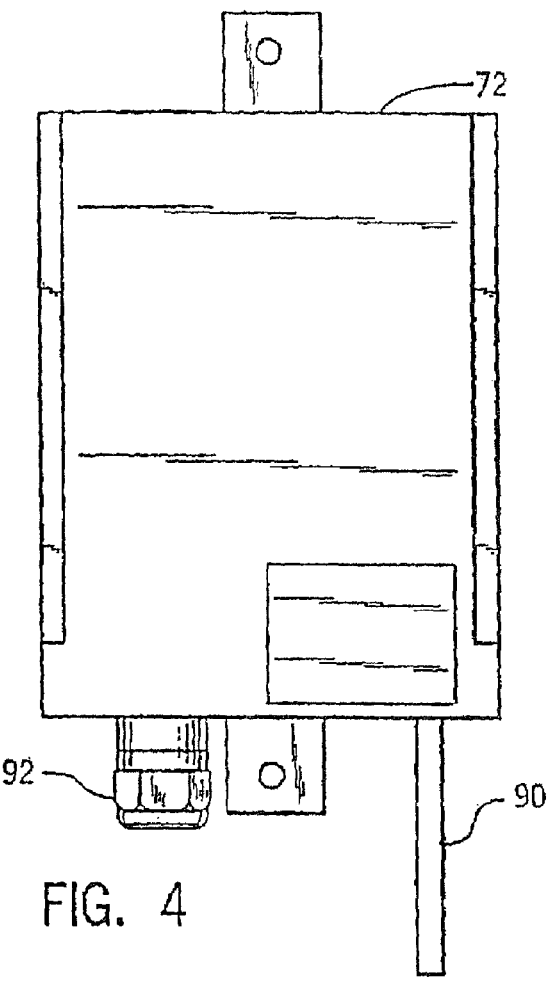
FIG. 4 is a front elevational view of a gateway node.

The gateway node 72 is shown in FIG. 4. The gateway node 72 is typically located on top of a power pole or other elevated location so that it may act as a communication node between LAN 74 and WAN 78. The gateway node 72 includes an antenna 90 for receiving and transmitting data over the RF communication links, and a power line carrier connector 92 for connecting a power line to power the gateway node 72. The gateway node 72 may also be solar powered. The compact design allows for easy placement on any existing utility pole or similarly situated elevated location. The gateway node 72 provides end to end communications from the meter 10 to the utility 76. The wireless gateway node 72 interfaces with the electric meter 10 over a two-way wireless 900 MHz spread spectrum LAN 74. Also, the gateway node 72 will interface and be compatible with any commercially available WAN 78 for communicating commodity usage and power quality information with the utility. The gateway node 72 is field programmable to meet a variety of data reporting needs.

The gateway node 72 receives data requests from the utility, interrogates the meter and forwards commodity usage information, as well as power quality information, over the WAN 78 to the utility 76. The gateway node 72 exchanges data with certain, predetermined, meters for which it is responsible, and "listens" for signals from those meters. The gateway node 72 does not store data for extended periods, thus minimizing security risks. The gateway node's RF communication range is typically one mile.

A wide variety of fixed wide area network (WAN) communication systems such as those employed with two-way pagers, cellular telephones, conventional telephones, narrowband personal communication services (PCS); cellular digital packet data (CDPD) systems, and satellites may be used to communicate data between the gateway nodes and the utility. The data communication system utilizes channelized direct sequence 900 MHz spread spectrum transmissions for communicating between the meters and gateway nodes. An exemplary gateway node includes the Silver Spring Network Gateway node that uses the AxisPortal V2.2 and common carrier wide area networks such as telephone, code-division multiple access ("CDMA") cellular networks. Other exemplary gateway node includes the Silver Spring Network AxisGate Network Gateway.

Circuitry of Gateway Node

Figure 7:
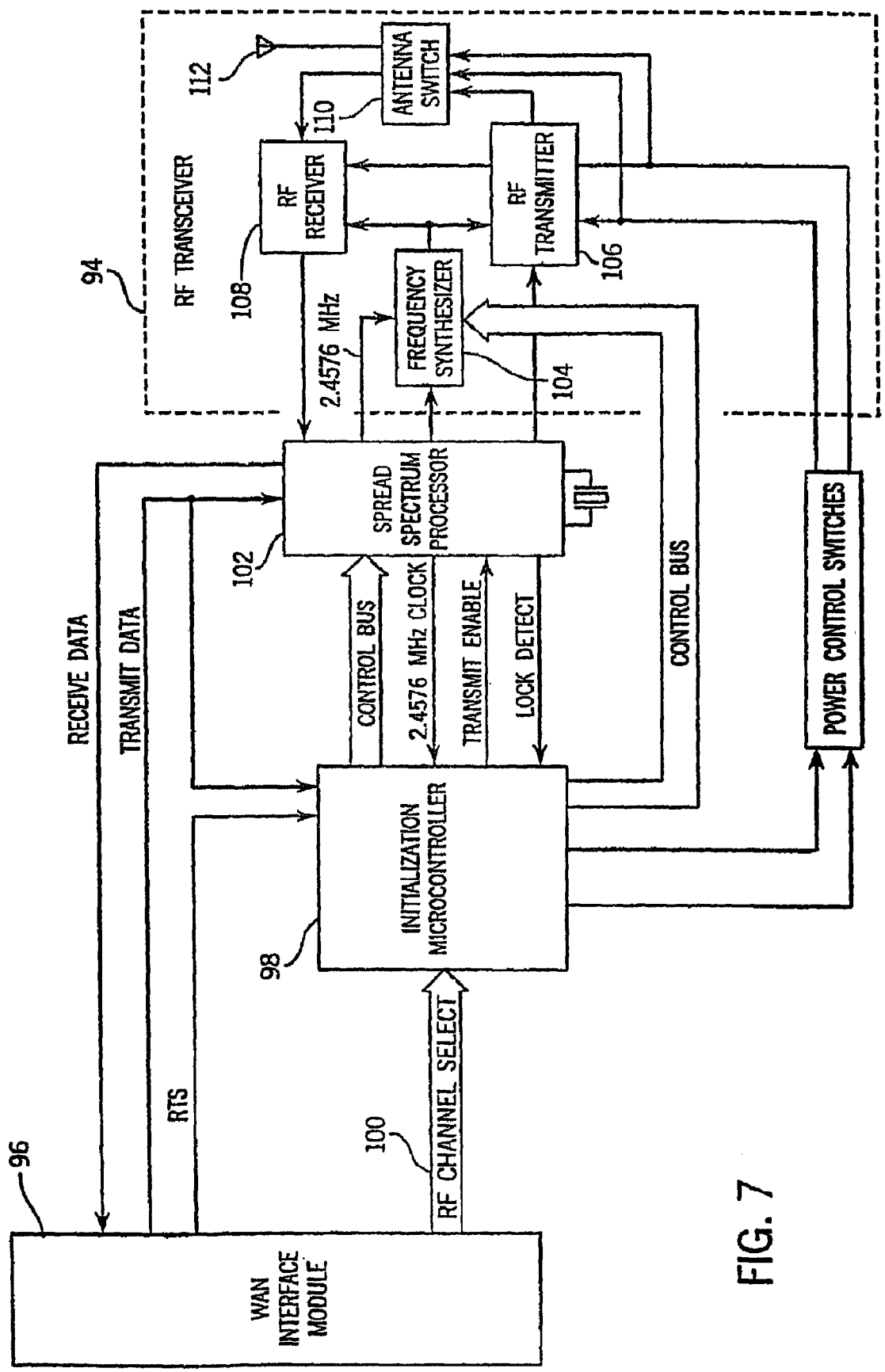
FIG. 7 is a block diagram of the gateway node circuitry.

FIG. 7 shows a block diagram of the gateway node circuitry. The RF transceiver section 94 of gateway node 72 is the same as the RF transceiver section 60 of electric meter 10 and certain portions thereof, such as the spread spectrum processor and frequency synthesizer, are shown in greater detail in FIG. 7. The gateway node 72 includes a WAN interface module 96 which may incorporate electronic circuitry for a two-way pager, power line carrier (PLC), satellite, cellular telephone, fiber optics, cellular digital packet data (CDPD) system, personal communication services (PCS), or other commercially available fixed wide area network (WAN) system. The construction of WAN interface module 96 and initialization microcontroller 98 may change depending on the desired WAN interface. RF channel selection is accomplished through an RF channel select bus 100 which interfaces directly with the initialization microcontroller 98.

Initialization microcontroller 98 controls all node functions including programming spread spectrum processor 102, RF channel selection in frequency synthesizer 104 of RF transceiver 94, transmit/receive switching, and detecting failures in WAN interface module 96.

Upon power up, initialization microcontroller 98 will program the internal registers of spread spectrum processor 102, read the RF channel selection from the electric meter 10, and set the system for communication at the frequency corresponding to the channel selected by the meter 10.

Selection of the RF channel used for transmission and reception is accomplished via the RF channel select bus 100 to initialization microcontroller 98. Valid channel numbers range from 0 to 23. In order to minimize a possibility of noise on the input to initialization microcontroller 98 causing false channel switching, the inputs have been debounced through software. Channel selection data must be present and stable on the inputs to initialization microcontroller 98 for approximately 250 µs before the initialization microcontroller will accept it and initiate a channel change. After the channel change has been initiated, it takes about 600 µs for frequency synthesizer 104 of RF transceiver 94 to receive the programming data and for the oscillators in the frequency synthesizer to settle to the changed frequency. Channel selection may only be completed while gateway node 72 is in the receive mode. If the RF channel select lines are changed during the transmit mode the change will not take effect until after the gateway node has been returned to the receive mode.

Once initial parameters are established, initialization microcontroller 98 begins its monitoring functions. When gateway node 72 is in the receive mode, the initialization microcontroller 98 continuously monitors RF channel select bus 100 to determine if a channel change is to be implemented.

For receiving data, gateway node 72 monitors the electric meter 10 to determine the presence of data. Some additional handshaking hardware may be required to sense the presence of a spread spectrum signal.

An alarm message is sent automatically by electric meter 10 in the event of a tamper or alarm condition, such as a power outage. The message is sent periodically until the error has cleared. Gateway node 72 must know how many bytes of data it is expecting to see and count them as they come in. When the proper number of bytes is received, reception is deemed complete and the message is processed. Any deviation from the anticipated number of received bytes may be assumed to be an erroneous message.

During the transmit mode of gateway node 72, initialization microcontroller 98 monitors the data line to detect idle conditions, start bits, and stop bits. This is done to prevent gateway node 24 from continuously transmitting meaningless information in the event a failure of WAN interface module 96 occurs and also to prevent erroneous trailing edge data from being sent which cannot terminate transmissions in a timely fashion. The initialization microcontroller 98 will not enable RF transmitter 106 of RF transceiver 94 unless the data line is in the invalid idle state when communication is initiated.

A second watchdog function of initialization microcontroller 98 when gateway node 72 is in the transmit mode is to test for valid start and stop bits in the serial data stream being transmitted. This ensures that data is read correctly. The first start bit is defined as the first falling edge of serial data after it has entered the idle stage. All further timing during that communication episode is referenced from that start bit. Timing for the location of a stop bit is measured from the leading edge of a start bit for that particular byte of data. Initialization microcontroller 98 measures an interval which is 9.5 bit times from that start bit edge and then looks for a stop bit. Similarly, a timer of 1 bit interval is started from the 9.5 bit point to look for the next start bit. If the following start bit does not assert itself within 1 bit time of a 9.5 bit time marker a failure is declared. The response to a failure condition is to disable RF transmitter 106.

Communication to and from electric meter 10 may be carried out in one of a preselected number, for example 24 channels in a preselected frequency band, for example 902-928 MHz. The meter 10 receives data and transmits a response on a single RF channel which is the same for both transmit and receive operation. As hereinafter described, the specific RF channel used for communication is chosen during commissioning and installation of the unit and loaded into memory. The RF channel is chosen to be different from the operating channels of other, adjacent interface management units, thereby to prevent two or more interface management units from responding to the same interrogation signal.

Frequency synthesizer 104 performs the modulation and demodulation of the spread spectrum data provided by spread spectrum processor 60 onto a carrier signal and demodulation of such data from the carrier signal. The RF transceiver has separate transmitter 106 and receiver 108 sections fed from frequency synthesizer 104.

The output of the spread spectrum processor to frequency synthesizer comprises a 2.4576 MHz reference frequency signal in conductor and a PN encoded base band signal in conductor. Frequency synthesizer may comprise a National Semiconductor LMX2332A Dual Frequency Synthesizer.

The direct sequence modulation technique employed by frequency synthesizer uses a high rate binary code (PN code) to modulate the base band signal. The resulting spread signal is used to modulate the transmitter's RF carrier signal. The spreading code is a fixed length PN sequence of bits, called chips, which is constantly being recycled. The pseudo-random nature of the sequence achieves the desired signal spreading, and the fixed sequence allows the code to be replicated in the receiver for recovery of the signal. Therefore, in direct sequence, the base band signal is modulated with the PN code spreading function, and the carrier is modulated to produce the wide band signal.

Minimum shift keying (MSK) modulation is used in order to allow reliable communications, efficient use of the radio spectrum, and to keep the component count and power consumption low. The modulation performed by frequency synthesizer 72 is minimum shift keying (MSK) at a chip rate of 819.2 Kchips per second, yielding a transmission with a 6 dB instantaneous bandwidth of 670.5 KHz.

The receiver bandwidth of this spread spectrum communication technique is nominally 1 MHz, with a minimum bandwidth of 900 KHz. Frequency resolution of the frequency synthesizer is 0.2048 MHz, which will be used to channelize the band into 24 channels spaced a minimum of 1.024 MHz apart. This frequency channelization is used to minimize interference between interface management units within a common communication range as well as providing growth for future, advanced features associated with the data communication system.

Frequency control of the RF related oscillators in the system is provided by dual phase locked loop (PLL) circuitry within frequency synthesizer. The phase locked loops are controlled and programmed by initialization microcontroller via a serial programming control bus, FIG. 7. The frequency synthesizer produces two RF signals which are mixed together in various combinations to produce a transmission carrier and to demodulate incoming RF signals. The transmission carrier is based on frequencies in the 782-807 MHz range and the demodulation signal is based on frequencies in the 792-817 MHz range. These signals may be referred to as RF transmit and RF receive local oscillation signals.

Table 1 below is a summary of the transmission channel frequencies and associated frequency synthesizer transmit/receive outputs. The signals in the table are provided by the two PLL sections in the dual frequency synthesizer.

TABLE 1

| Channel Number | Channel Frequency (MHz) | Transmit Local Oscillation (MHz) | Receive Local Oscillation (MHz) |
|---|---|---|---|
| 0 | 902.7584 | 782.3360 | 792.1664 |
| 1 | 903.7824 | 783.3600 | 793.1904 |
| 2 | 904.8064 | 784.3840 | 794.2144 |
| 3 | 905.8304 | 785.4080 | 795.2384 |
| 4 | 906.8544 | 786.4320 | 796.2624 |
| 5 | 907.8784 | 787.4560 | 797.2864 |
| 6 | 908.9024 | 788.4800 | 798.3104 |
| 7 | 910.1312 | 789.7088 | 799.5392 |
| 8 | 911.1552 | 790.7328 | 800.5632 |
| 9 | 912.1792 | 791.7568 | 801.5872 |
| 10 | 913.2032 | 792.7808 | 802.6112 |
| 11 | 914.2272 | 793.8048 | 803.6352 |
| 12 | 915.2512 | 794.8288 | 804.6592 |
| 13 | 916.2752 | 795.8528 | 805.6832 |
| 14 | 917.2992 | 796.8768 | 806.7072 |
| 15 | 918.3232 | 797.9008 | 807.7312 |
| 16 | 919.9616 | 799.5392 | 809.3696 |
| 17 | 920.9856 | 800.5632 | 810.3936 |
| 18 | 922.0096 | 801.5872 | 811.4176 |
| 19 | 923.2384 | 802.8160 | 812.6464 |
| 20 | 924.2624 | 803.8400 | 813.6704 |
| 21 | 925.2864 | 804.8640 | 814.6944 |
| 22 | 926.3104 | 805.8880 | 815.7184 |
| 23 | 927.3344 | 806.9120 | 816.7424 |

A third signal, which is fixed at 120.4224 MHz, is also supplied by the dual frequency synthesizer. This signal is referred to as the intermediate frequency (IF) local oscillation signal.

In transmission mode, frequency synthesizer 104 provides a signal having a frequency in the 782-807 MHz range, modulated with the data to be transmitted. RF transmitter section 106 mixes the signal with the fixed frequency IF local oscillator signal. This results in an RF signal which ranges between 902 MHz and 928 MHz. The signal is filtered to reduce harmonics and out of band signals, amplified and supplied to antenna switch 110 and antenna 112.

It is recognized that other equivalents, alternatives, and modifications aside from those expressly stated, are possible and within the scope of the appended claims.

What is claimed is:
1. A commodity monitoring network comprising:
an RF communication unit that interfaces with a device that measures a utilization characteristic of a commodity provided by a commodity provider, and that is operable to wirelessly transmit utilization data generated by said device; and a gateway node including:
- a transceiver section that wirelessly receives data including the utilization data and a channel selection transmitted from the RF communication unit,
- a network interface module that couples the gateway node to a communications network, and
- a programmable controller coupled to the transceiver section, to process the channel selection received by the transceiver section, and to set the transceiver section at a transceiver frequency corresponding to the channel selection.

2. The commodity monitoring network of claim 1, comprising a plurality of RF communication units respectively associated with different measuring devices.

3. The commodity monitoring network of claim 2, wherein the controller is responsive to the receipt of data by the network interface module to determine a selected one of said plurality of RF communication units that is indicated in said data, to generate a message based upon said received data, and to transmit said message to said selected one of said plurality of RF communication units via a channel associated with the selected RF communication unit.

4. The commodity monitoring network of claim 2, wherein the controller includes a scheduler operable to access a list in accordance with timing information, to generate a message, and to route said message to individual RF communication units based on the list.

5. The commodity monitoring network of claim 4, wherein said gateway node includes a data store containing a schedule of times when said message is to be generated and routed to said RF communication units.

6. The commodity monitoring network of claim 2, wherein at least one of said RF communication units interfaces with a plurality of different measuring devices.

7. The commodity monitoring network of claim 1, wherein the network interface module couples the gateway node to a common carrier wide area network.

8. The commodity monitoring network of claim 1, wherein the measuring device is a utility meter.

9. A commodity monitoring network comprising:
- an RF communication unit operable to wirelessly transmit utilization data generated by a device that measures a utilization characteristic of a commodity provided by a commodity provider; and
- a gateway node that receives data, including the utilization data and a channel selection, via a network, processes the received channel selection, and sets a transceiver frequency corresponding to the channel selection.

10. The commodity monitoring network of claim 9, comprising a plurality of RF communication units respectively associated with different measuring devices.

11. The commodity monitoring network of claim 10, wherein the gateway node is responsive to the receipt of data via a network to determine a selected one of said plurality of RF communication units that is indicated in said data, to generate a message based upon said received data, and to transmit said message to said selected one of said plurality of RF communication units via a channel associated with the selected RF communication unit.

12. The commodity monitoring network of claim 10, wherein the gateway node includes a scheduler operable to access a list in accordance with timing information, to generate a message, and to route said message to individual RF communication units based on the list.

13. The commodity monitoring network of claim 12, wherein said gateway node includes a data store containing a schedule of times when said message is to be generated and routed to said RF communication units.

14. The commodity monitoring network of claim 9, wherein gateway node is coupled to a common carrier wide area network.

15. The commodity monitoring network of claim 10, wherein the gateway node includes a transceiver for wirelessly transmitting and receiving data to and from said RF communication units.

16. The commodity monitoring network of claim 9, wherein the measuring device is a utility meter.

17. The commodity monitoring network of claim 9, wherein said channel selection is transmitted to the gateway node from the RF communication unit.

* * * * *